(12) United States Patent
Betz et al.

(10) Patent No.: US 6,561,936 B1
(45) Date of Patent: May 13, 2003

(54) BELT TENSIONER SYSTEM

(75) Inventors: Hans-Peter Betz, Böbingen (DE); Remy Fliedner, Spraitbach (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/521,831

(22) Filed: Mar. 9, 2000

(30) Foreign Application Priority Data

Mar. 10, 1999 (DE) .......................................... 299 04 404

(51) Int. Cl.$^7$ ................................................. F16H 7/22
(52) U.S. Cl. ........................................ 474/110; 297/480
(58) Field of Search ................................ 474/111, 113, 474/117, 140; 297/480; 280/806

(56) References Cited

U.S. PATENT DOCUMENTS

| | | | |
|---|---|---|---|
| 3,871,470 A | * 3/1975 | Schwanz et al. | 180/82 |
| 3,951,430 A | * 4/1976 | Schawanz et al. | 280/744 |
| 4,014,565 A | * 3/1977 | Fieni | 280/744 |
| 4,023,427 A | * 5/1977 | Beier | 74/242.1 |
| 4,328,976 A | * 5/1982 | Tsuge et al. | 280/806 |
| 5,704,638 A | 1/1998 | Lane, Jr. | 280/730.2 |
| 5,913,486 A | * 6/1999 | Pywell et al. | 242/374 |
| 6,139,058 A | * 10/2000 | Bohmler | 280/806 |

FOREIGN PATENT DOCUMENTS

| | | | |
|---|---|---|---|
| DE | 1269505 | 5/1968 | |
| DE | 2811694 | 9/1979 | |
| DE | 30 44 951 | * 6/1982 | ........... A62B/35/02 |
| DE | 2726096 | 7/1988 | |
| DE | 3829694 A1 | 3/1990 | |
| EP | 0884226 | 12/1998 | |
| EP | 0884226 A1 | 12/1998 | |

OTHER PUBLICATIONS

JP 6–72289 Patents Abstracts of Japan, M–1623, Jun. 17, 1994, vol. 18, No. 319.

* cited by examiner

Primary Examiner—David A. Bucci
Assistant Examiner—Vicky Johnson
(74) Attorney, Agent, or Firm—Tarolli, Sundheim, Covell & Tummino L.L.P.

(57) ABSTRACT

The invention relates to a belt tensioner system comprising a belt, a piston/cylinder unit comprised of a piston and a cylinder, and a drive for the piston/cylinder unit. The system further comprises a power transmission device which is directly connected with the piston/cylinder unit and, at least in the case of restraint, with the belt and which on activation of the drive converts a movement brought about in the piston/cylinder unit into a displacement of the belt. The power transmission device is constructed as a push rod.

9 Claims, 3 Drawing Sheets

BELT TENSIONER SYSTEM

TECHNICAL FIELD

The invention relates to a belt tensioner system.

BACKGROUND OF THE INVENTION

Such belt tensioner systems are also known as so-called linear tensioners. They can be constructed as an end fitting tensioner or buckle tensioner. Furthermore, belt tensioner systems are known, in which the power transmission means engages on the belt between the end fitting and the deflection fitting arranged on the B-column and draws the belt downwards. The belt tensioner systems known hitherto have the disadvantage that they take up a large amount of space and that the elongated piston/cylinder unit generally projects vertically upwards from the vehicle floor. The known belt tensioner systems require a very large amount of space, so that their accommodation in the vehicle presents problems. Furthermore, the sealing of the traction cable, which forms the power transmission means, is a problem with respect to the end wall of the cylinder through which the traction cable extends. A good seal is only possible here with a high expenditure.

BRIEF SUMMARY OF THE INVENTION

The invention provides a belt tensioner system which is small in size and is simply constructed, and which is distinguished by a high degree of variability of installation in the vehicle. This is achieved in a belt tensioner system which comprises a belt, a piston/cylinder unit comprised of a piston and a cylinder, and a drive for the piston/cylinder unit. The system further comprises a power transmission means which is directly connected with the piston/cylinder unit and, at least in the case of restraint, with the belt and which on activation of the drive converts a movement brought about in the piston/cylinder unit into a displacement of the belt. The power transmission means is constructed as a push rod. In contrast to the known tensioner systems, in which the power transmission means engages directly on the belt, in the belt tensioner system according to the invention, no traction cable is provided, but rather a push rod. The push rod can project out from the end of the cylinder opposite to the drive, the sealing taking place with respect to this free end of the cylinder through the seal of the piston. An additional sealing of the power transmission means with respect to the cylinder, as was necessary in the prior art between traction cable and end wall, is dispensed with.

The use of a push rod in connection with a belt deflection, when the belt is part of the system, provides for a small structural space for the belt tensioner system. The deflection of the belt is achieved through the push rod which defines the apex region of the deflected belt and displaces this apex region axially. The apex region does not have to be a fixed region of the belt, but rather is usually the region of the belt which is deflected. On displacement of the push rod, the section of the push rod which engages on the belt travels along the belt and displaces the apex region in axial direction. As the push rod is arranged as it were between the belt webbing sections which are deflected for example through 180° and displaces the apex region, the belt webbing with a piston travel s is displaced by twice s, i.e. twice the distance. The piston/cylinder unit together with the drive system can therefore be of shorter and smaller construction with the same tensioning length than with a conventional linear tensioner which is to have the same tensioning length. The belt tensioner system is therefore also axially short in construction, because owing to the provision of a push rod, the piston/cylinder unit together with the drive lie between the deflected belt webbing sections, i.e. can be surrounded by the belt. With an arrangement of the piston/cylinder unit outside the space defined by the deflected regions, the axial structural space of the belt tensioner system is lengthened by the axial length of the piston/cylinder unit together with the drive connected therewith.

When the push rod has at its end remote from the piston/cylinder unit a curved belt contact surface engaging on the belt and defining the apex region, a lower-friction relative movement results between the contact surface and the belt. In addition, the contact surface must be constructed such that a sliding down of the belt from the contact surface during the tensioning process is prevented. In order to achieve this, the push rod has an elongated section running parallel to the displacement direction and a section adjoining the end of this elongated section on the webbing side, extending transversely hereto. This section running transversely to the elongated section has the curved belt contact surface.

The belt is deflected in a housing. The piston/cylinder unit together with the drive is constructed according to the preferred embodiment as a separate, preassembled module. This module can be transported independently of the housing and of the belt and can only be inserted into the housing at the end of the assembly procedure and arranged on it or on the vehicle. Thus, a type of modular concept results, which permits a so-called separate assembly of safety belt and tensioner drive (piston/cylinder unit with drive). In the prior art, usually complete units of safety belt and tensioner drive are necessary, which are bulky for assembly in the vehicle and are only able to be arrested with increased expenditure. In the belt tensioner system according to the invention, the belt can already be fully installed in the vehicle. Then, by fastening the pre-assembled module, the belt tensioner system is completed.

The belt runs in or immediately outside the housing through a deflection fitting and extends after the deflection fitting substantially transversely to the longitudinal axis of the cylinder. With this design, the belt tensioner system, which as a whole is elongated in construction, can be installed lying, i.e. horizontal and parallel to the vehicle floor. Its position can, however, be varied by the deflection fitting between the belt tensioner system and the belt running outside the belt tensioner system, without a different construction of the belt tensioner system being required.

The piston/cylinder unit is preferably fastened to the deflection fitting. This has the advantage that the piston/cylinder unit or the entire assembly of piston/cylinder unit with drive and the housing together with the belt deflected therein do not have to be fastened by means of separate openings in the vehicle. Fastening openings in the vehicle in fact have large tolerances with respect to each other. If, however, the piston/cylinder unit is fastened to the deflection fitting, these two parts can be produced in close tolerances in the region of their fastening, which simplifies the assembly. Furthermore, the piston/cylinder unit can of course also be arrested on the housing or on an end fitting. Here, the same advantages just mentioned result in assembly and manufacture.

In order to save overall height, which depends in particular on the diameter of the cylinder, instead of one piston/cylinder unit, also a plurality of units connected in parallel can be provided, which are coupled with each other. A further possibility of saving overall height consists in selecting an oval or rectangular cylinder.

DETAILED DESCRIPTION OF THE PREFERRED EMBODIMENTS

Figure 1:
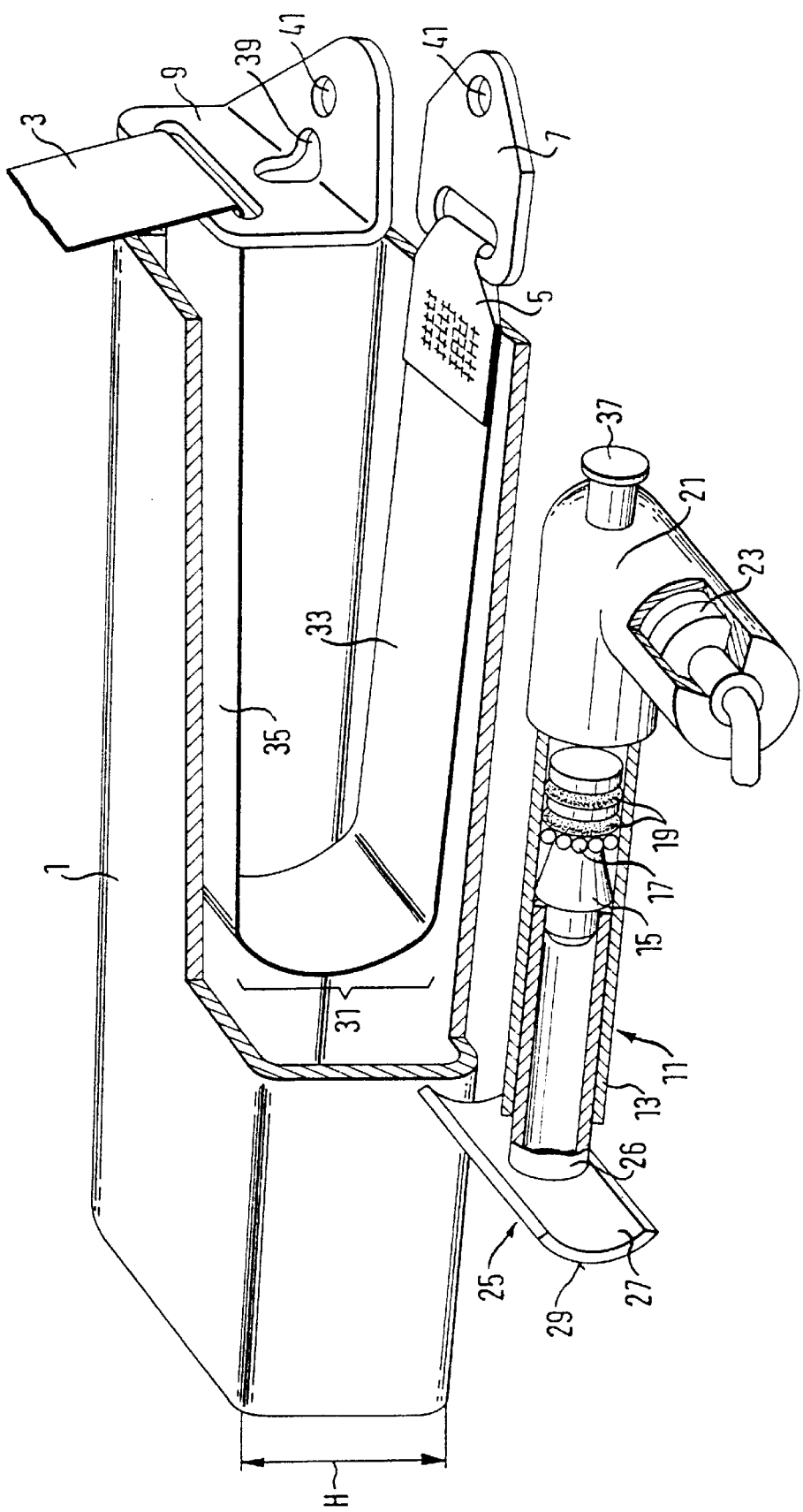
FIG. 1 shows an embodiment of the belt tensioner system according to the invention with cut-open housing and with a drive removed from the housing, together with piston/cylinder unit.

In FIG. 1 a belt tensioner system is illustrated, which in the horizontal state shown in FIG. 1 can be arranged on a vehicle floor of a motor vehicle. The belt tensioner system consists of a housing 1 which is box-shaped, and of a safety belt 3 which is arrested at one end 5 on an end fitting 7. The belt 3 runs from this end 5 into the interior of the housing, is deflected therein through 180° with the formation of a loop and then runs again to the end of the housing 1 on the end face, on which the end fitting 7 also lies. The belt 3 extends through a deflection fitting 9, bent in an L-shape, and is deflected here upwards through approximately 90°, so that it can run to a further deflection fitting which is fastened at shoulder height on the B-column of the vehicle.

The housing 1 can surround the end fitting 7 and the deflection fitting 9 partially or completely, however in any case it must have at least one suitable opening, so that the belt 3 can extend in front of or after the deflection fitting 9 out from the housing 1.

The belt tensioner system has, furthermore, a piston/cylinder unit 11, which consists of a cylinder 13 and of a piston 15. Locking balls 17 are arranged on the cone-shaped piston 15. Reference number 19 designates seals which are intended to seal the piston 15 with respect to the cylinder 13. A drive 21, fastened to the cylinder 13 and having a gas generator 23, provides in the case of restraint for a displacement of the piston in axial direction. A power transmission means in the form of a push rod 25 is fastened to the piston 15 on a shoulder of the piston. The push rod 25 has a tubular section extending parallel to the displacement direction and a section 27, arranged at the end of this elongated section on the webbing side, extending transversely hereto. This section 27 is fastened for example by welding on the elongated section 26 and has a curved shape with a belt contact surface 29 in the shape of a circular arc.

The piston/cylinder unit 11 together with the drive 21 forms a separate, pre-assembled module. In the assembly of the belt tensioner system, firstly the belt 3 can be mounted in the vehicle by the end fitting 7 being fastened directly to the vehicle or to the housing 1. The housing 1 can be arranged on the vehicle floor previously, at the same time or subsequently. Finally, the pre-assembled module with piston/cylinder unit 11 and drive 21 can preferably be inserted axially into the housing 1. The belt 3 lies here against the belt contact surface 29 and is deflected by the latter. The region in which the belt 3 is deflected is designated apex region 31 hereinbelow. Before and after the apex region, belt webbing sections 33 and 35 result.

The drive 21 has on its reverse face a mushroom-like projection 37, onto which the deflection fitting 9 is placed from above, by the latter having a type of keyhole opening 39 into which the projection protrudes. This keyhole opening 39 is then closed when the deflection fitting 9 is placed onto the end fitting 7 and together with it is screwed via openings 41 on the vehicle or on the elongated housing 1.

By the module of drive 21 and piston/cylinder unit 13 lying between the belt webbing sections 33 and 35, a small axial structural space results.

In the case of restraint, the piston 15 is displaced to the left according to FIG. 1, so that the push rod 25 is likewise displaced to the left and the elongated section 26 projects still further out from the cylinder 13. The apex region 21 travels still deeper into the housing 1, so that the belt webbing sections 33 and 35 become longer. Resulting as tensioning length for the belt is twice the extent of the piston which this covers on displacement.

In the embodiment illustrated in FIG. 1, the push rod 25 with the section 27 does not lie against the housing 1. However, it can be useful for guiding purposes if a guide is provided between the section 27 and the housing. This guide can be achieved for example in that pins on the section 27 are held in recesses in the housing 1. Theoretically, it would even be possible in this embodiment to form the power transmission means from a plurality of parts which are not connected permanently with each other.

Figure 2:
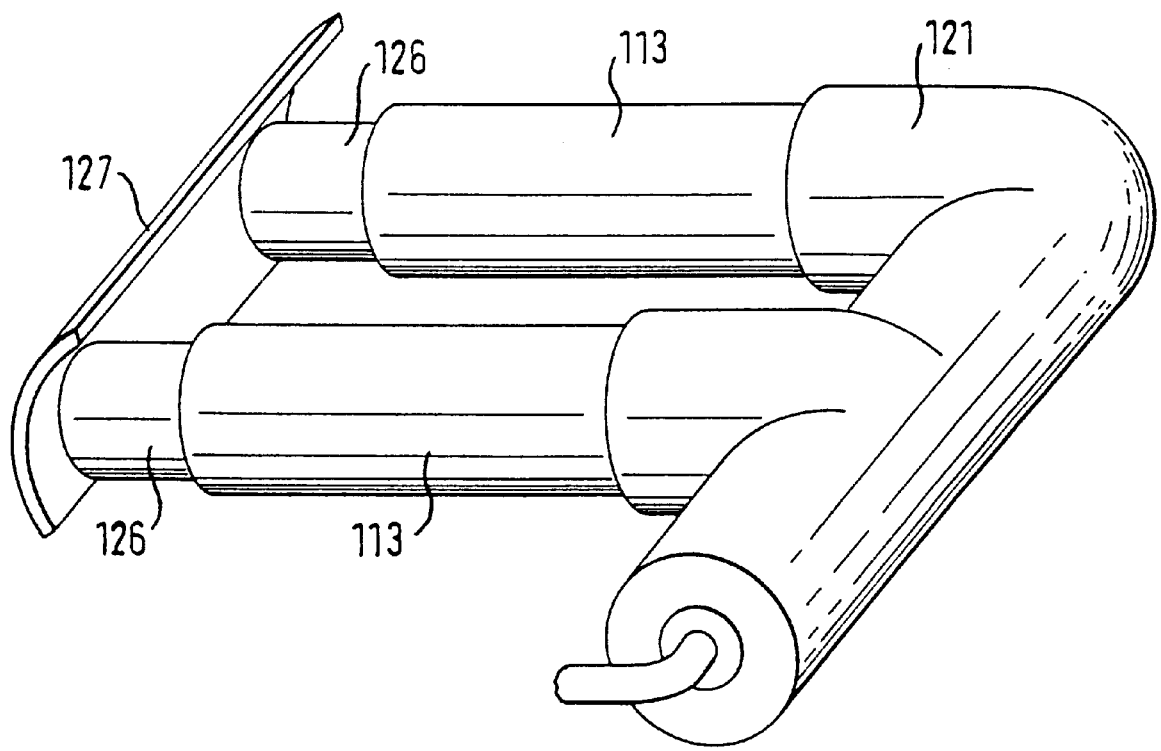
FIG. 2 shows a perspective view of another drive design with two parallel piston/cylinder units and a drive coupled with each other.

When the belt tensioner system is to have an even smaller overall height H, it can be advantageous to arrange two piston/cylinder units 113 parallel to each other, which are coupled for example with a drive 121, as is illustrated in FIG. 2.

The two elongated sections 126 of the push rods are then connected with each other via a common section 127 running transversely hereto.

Figure 3:
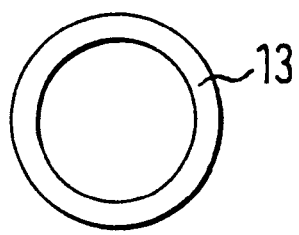
FIGS. 3 to 5 show various cross-sections for the cylinder of the piston/cylinder unit.
Figure 4:
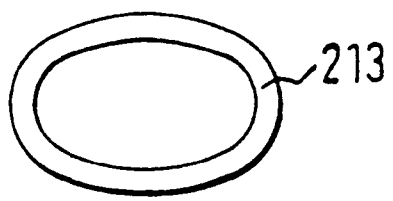
Figure 5:
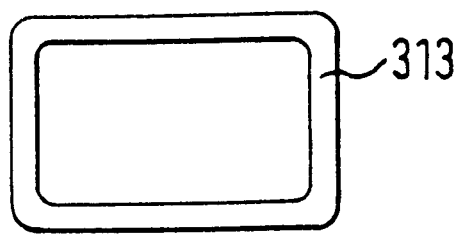

A further possibility for saving overall height consists in providing an oval cross-section according to FIG. 4 for the cylinder 213 or a rectangular, elongated cross-section for a cylinder 313 according to FIG. 5, instead of the circular cylindrical cross-section of the cylinder 13 shown in FIG. 3.

What is claimed is:

1. A belt tensioner system comprising:

a belt, a piston/cylinder unit having a piston and a cylinder, a drive for said piston/cylinder unit, a push rod directly connected with said piston/cylinder unit, and a deflection fitting with a keyhole opening, said push rod having a first end which is, at least in the case of restraint, directly connected with said belt, said first end of said push rod moving away from said cylinder on activation of said piston/cylinder unit, said push rod converting a movement brought about in said piston/cylinder unit into a displacement of said belt on activation of said drive, and said piston/cylinder unit, at an axial end remote from said push rod, having a mushroom-like projection which is arrested in said keyhole opening to fasten said piston/cylinder unit to said deflection fitting.

2. The belt tensioner system according to claim 1, wherein said keyhole opening is closed by fastening said deflection fitting.

3. A belt tensioner system according to claim 1, wherein said belt runs through said deflection fitting and extends after said deflection fitting transversely to a longitudinal extent of said cylinder.

4. A belt tensioner comprising:

a belt, a piston/cylinder unit having a piston and a cylinder, said cylinder being oval in cross-section, a drive for said piston/cylinder unit, and a push rod directly connected with said piston/cylinder unit, said push rod having a first end which is, at least in the case of restraint, directly connected with said belt, said first end of said push rod moving away from said cylinder on activation of said piston/cylinder unit, and said push rod converting a movement brought about in said piston/cylinder unit into a displacement of said belt on activation of said drive.

5. A belt tensioner system comprising:

a belt, at least two piston/cylinder units each having a piston and a cylinder, said cylinders being arranged adjacently and parallel to each other, a drive for said piston/cylinder units, and said piston/cylinder units having associated push rods which are coupled with each other, said push rods each having a first end which is, at least in the case of restraint, directly connected with said belt, said first ends of said push rods moving away in the same direction from said cylinders on activation of said piston/cylinder units, said push rods converting, on activation of said drive, a movement brought about in said piston/cylinder units into a displacement of said belt.

6. A belt tensioner comprising:

a belt, a housing, a single piston/cylinder unit having a piston movable in a cylinder contained in said housing, a drive for said piston/cylinder unit, and a push rod which is directly connected with said piston/cylinder unit and, at least in the case of restraint, with said belt, said belt extending into said housing and being guided within said housing to form a loop in the shape of a "U", the loop having two legs extending from a base portion, said base portion joining said two legs together, said drive, said single piston/cylinder unit and said push rod comprising a separate, preassembled module arranged within said housing, said module having two opposite ends and being completely arranged between said two legs in said loop, said one end of said module being non-displaceably fixed and said opposite end of said module having a belt contact surface contacting a belt area defining the bottom portion of said "U", said opposite end of said module and said belt contact surface being displaced upon activation of said drive by a relative displacement between, on the one hand, the cylinder and, on the other hand, the piston and the rod in order to displace and enlarge said loop formed by said belt, said push rod consisting of an elongated section running parallel to a displacement direction and of a section adjoining an end of said elongated section on a belt side, said latter section extending transversely to said elongated section and having said curved belt contact surface.

7. The belt tensioner system according to claim 6, wherein said module is constructed to be inserted in said loop after said belt is mounted in a vehicle.

8. A belt tensioner comprising:

a belt, a housing, a single piston/cylinder unit having a piston movable in a cylinder contained in said housing, a drive for said piston/cylinder unit, a push rod which is directly connected with said piston/cylinder unit and, at least in the case of restraint, with said belt, said belt extending into said housing and being guided within said housing to form a loop in the shape of a "U", said drive, said single piston/cylinder unit and said push rod comprising a separate, preassembled module arranged within said housing, said module having two opposite ends and being arranged in said loop, said one end of said module being non-displaceably fixed and said opposite end of said module having a belt contact surface contacting a belt area defining the bottom portion of said "U", said opposite end of said module and said belt contact surface being displaced upon activation of said drive by a relative displacement between, on the one hand, the cylinder and, on the other hand, the piston and the rod in order to displace and enlarge said loop formed by said belt, and a deflection fitting associated with said housing, said belt running through said deflection fitting and extending after said deflection fitting transversely to a longitudinal extent of said cylinder.

9. The belt tensioner system according to claim 8, wherein said push rod is fastened directly to said piston and extends outwards through an open end of said cylinder remote from said drive.

* * * * *